United States Patent
MacKinney et al.

(10) Patent No.: US 11,290,922 B2
(45) Date of Patent: *Mar. 29, 2022

(54) GENERATING AND PROVIDING RELATIVE QUALITY OF SERVICE INDICATORS

(71) Applicant: AT&T Mobility II LLC, Atlanta, GA (US)

(72) Inventors: Tamara Lynne MacKinney, Fayetteville, GA (US); Gary Casagrande, Bridgewater, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,344

(22) Filed: May 14, 2021

(65) Prior Publication Data

US 2021/0274388 A1 Sep. 2, 2021

Related U.S. Application Data

(63) Continuation of application No. 16/571,299, filed on Sep. 16, 2019, now Pat. No. 11,012,891, which is a
(Continued)

(51) Int. Cl.
*H04W 28/24* (2009.01)
*H04M 1/72469* (2021.01)

(52) U.S. Cl.
CPC ....... *H04W 28/24* (2013.01); *H04M 1/72469* (2021.01)

(58) Field of Classification Search
CPC .......................... H04W 28/24; H04M 1/72469
See application file for complete search history.

(56) References Cited

U.S. PATENT DOCUMENTS 8,190,997 B2 5/2012 Shellen
8,644,337 B2 2/2014 Siddam et al.
(Continued)

FOREIGN PATENT DOCUMENTS

CN    103856988    6/2014

OTHER PUBLICATIONS

Muntean et al., "QoS Parameters Mapping for the E-learning Traffic Mix in LTE Networks," IEEE International Joint Conferences on Computational Cybernetics and Technical Informatics (ICCC-CONTI 2010), May 27-29, 2010, pp. 299-304, IEEE.
(Continued)

*Primary Examiner* — Andrey Belousov
(74) *Attorney, Agent, or Firm* — Hartman & Citrin LLC

(57) ABSTRACT

Concepts and technologies are disclosed herein for relative quality of service indicators. A processor obtains quality of service data for a sector that is serving a user device. In response to determining that a quality of service associated with the sector is degraded, an offer can be provided to the user device to upgrade the quality of service. In response to detecting acceptance of the offer, enhancement of the quality of service can be triggered. Quality of service data for the sector can be collected. The quality of service data can represent the quality of service for the user device and a further quality of service for another device located in the sector. Quality of service display data that presents the quality of service for the user device and the further quality of service for the other device can be generated and provided to the user device for display.

20 Claims, 10 Drawing Sheets

Related U.S. Application Data continuation of application No. 15/048,618, filed on Feb. 19, 2016, now Pat. No. 10,419,976.

(56) References Cited

U.S. PATENT DOCUMENTS

| | | |
|---|---|---|
| 8,660,026 B2 | 2/2014 | Yang et al. |
| 9,077,649 B2 | 7/2015 | Kotecha et al. |
| 2011/0109472 A1 | 5/2011 | Spirakis |
| 2011/0188457 A1 | 8/2011 | Shu |
| 2013/0061127 A1 | 3/2013 | Reyes |
| 2014/0133410 A1 | 5/2014 | Nguyen et al. |
| 2014/0295872 A1 | 10/2014 | Chang et al. |
| 2015/0230179 A1 | 8/2015 | Gupta et al. |
| 2015/0281465 A1 | 10/2015 | Mo et al. |
| 2015/0334644 A1 | 11/2015 | Kim et al. |
| 2015/0334732 A1 | 11/2015 | Caretti et al. |

OTHER PUBLICATIONS

U.S. Office Action dated Jun. 11, 2018 in U.S. Appl. No. 15/048,618.
U.S. Office Action dated Jan. 4, 2019 in U.S. Appl. No. 15/048,618.
U.S. Notice of Allowance dated May 1, 2019 in U.S. Appl. No. 15/048,618.
U.S. Office Action dated Jun. 24, 2020 in U.S. Appl. No. 16/571,299.
U.S. Notice of Allowance dated Jan. 12, 2021 in U.S. Appl. No. 16/571,299.

GENERATING AND PROVIDING RELATIVE QUALITY OF SERVICE INDICATORS

CROSS-REFERENCE TO RELATED APPLICATIONS

This application is a continuation of and claims priority to U.S. patent application Ser. No. 16/571,299, entitled "Generating and Providing Relative Quality of Service Indicators," filed Sep. 16, 2019, now U.S. Pat. No. 11,012,891, which is incorporated herein by reference in its entirety and which is a continuation of and claims priority to U.S. patent application Ser. No. 15/048,618, entitled "Generating and Providing Relative Quality of Service Indicators," filed Feb. 19, 2016, now U.S. Pat. No. 10,419,976, which is incorporated herein by reference in its entirety.

BACKGROUND

Quality of service ("QoS") in communications networks can vary widely based on location, time, devices, applications, network conditions and capabilities, and policy rules. Latency, download speed, upload speed, call quality, and the like, may vary greatly among users across the network, within a particular geographic area, within a single cell cite, and even on a single cell sector. For example, within a cell site, if one sector antenna is aimed toward an interstate highway with heavy traffic and a second sector antenna is aimed at woods and hills behind the tower (relative to the interstate highway), the users in a sector associated with the first sector antenna may experience a lower quality of service than users in a sector associated with the second sector antenna. Similarly, within a cell sector, some users on calls during a particularly busy time, may not have any problems, while a user who is downloading a data-intensive video, for instance, may experience increased latency.

In a fourth generation ("4G") long term evolution ("LTE") network, some communications may be prioritized. Thus, for example, emergency communications may be given a high priority relative to reporting of call statistics. At times, however, even prioritized data communications may be slow due to heavy traffic, network conditions, or other factors. In such cases, users who would expect to have a high priority and thus a higher speed, lower latency, or the like, may not perceive that their traffic is being prioritized.

SUMMARY

The present disclosure is directed to generating and providing relative quality of service indicators. For example, a user device may receive an offer to enhance, upgrade, improve, or otherwise modify or change the quality of service associated with that device. At some time, a user device may be located within or in communication with a portion of a communications network. An application, module, engine, or service such as a quality of service application can be executed by a server computer or other computing device. The quality of service application may receive the quality of service data from one or more network elements associated with the sector. The quality of service application can analyze the quality of service data and determine, based upon the quality of service data, various communications characteristics (e.g., latency of a data link, an uplink speed for the data link, a downlink speed for the data link, a voice quality, combinations thereof, or the like) or other aspects of quality of service for the user device at the sector.

In some embodiments, the quality of service application can compare determined or detected communications characteristics to various stored values, levels, or the like, to determine if quality of service at the sector is degraded or otherwise eligible for an upgrade. If the quality of service application determines that a quality of service at the sector is degraded (or otherwise eligible for an upgrade), the quality of service application can provide an offer to the user device. The offer, as explained above, can include an offer to enhance, improve, upgrade, and/or otherwise modify or change the quality of service associated with one or more communications associated with the user device. If the offer is accepted at the user device, the user device can inform the quality of service application.

In response to determining that the offer has been accepted, the quality of service application can trigger enhancement, improvement, upgrading, and/or other modifications of or to the quality of service for the user device. The quality of service application also can periodically collect quality of service data associated with the sector to determine if the quality of service has been upgraded and to generate a quality of service display for the user device. The quality of service application also can generate quality of service display data. The quality of service display data can represent measurable aspects of quality of service for the user device and the one or more other device(s) located in the sector.

The quality of service application can send the quality of service display data to the user device. The user device can generate and present a quality of service user interface. The quality of service user interface can include at least one relative quality of service indicator. The relative quality of service indicator can provide the user or other entity associated with the user device with context for his or her quality of service information. Thus, the relative quality of service indicator can compare the quality of service information associated with the user device with quality of service information associated with the one or more other devices in the sector.

According to one aspect of the concepts and technologies disclosed herein, a system is disclosed. The system can include a processor and a memory that stores computer-executable instructions that, when executed by the processor, cause the processor to perform operations. The operations can include obtaining quality of service data for a sector that is serving a user device, and in response to determining that a quality of service associated with the sector is degraded, providing an offer to the user device. The offer can include an offer to upgrade the quality of service for the user device. The operations further can include in response to detecting acceptance of the offer, triggering enhancement of the quality of service for the user device, and collecting quality of service data for the sector. The quality of service data can represent the quality of service for the user device and a further quality of service for another device or other devices located in the sector. The operations further can include generating quality of service display data that presents the quality of service for the user device and the further quality of service for the other device(s), and providing the quality of service display data. The user device can display the quality of service display data in a relative quality of service indicator.

In some embodiments, the computer-executable instructions, when executed by the processor, can cause the processor to perform additional operations. The operations can further include receiving, at the processor, opt-in data associated with the user device. In some embodiments, the opt-in data can indicate that the user device should receive quality of service enhancement offers. In some embodiments, the computer-executable instructions, when executed by the processor, cause the processor to perform operations that can further include determining, based on the quality of service data, communications characteristics for a communications link associated with the user device; comparing the communications characteristics for the communications link to predefined values; and determining, based on the comparing, that the quality of service associated with the sector is degraded.

In some embodiments, the relative quality of service indicator can include a first representation that depicts the quality of service for the user device; and a second representation that depicts the further quality of service for the other device(s). In some embodiments, the relative quality of service indicator can include an icon. In some embodiments, the system can include a network element associated with the sector. The quality of service data can be received from the network element associated with the sector, and the sector can include a portion of a cell of a cellular network.

According to another aspect of the concepts and technologies disclosed herein, a computer storage medium is disclosed. The computer storage medium can have computer-executable instructions stored thereon that, when executed by a processor, cause the processor to perform operations. The operations can include obtaining quality of service data for a sector that is serving a user device, and in response to determining that a quality of service associated with the sector is degraded, providing an offer to the user device. The offer can include an offer to upgrade the quality of service for the user device. The operations also can include in response to detecting acceptance of the offer, triggering enhancement of the quality of service for the user device, and collecting quality of service data for the sector. The quality of service data can represent the quality of service for the user device and a further quality of service for another device or other devices located in the sector. The operations also can include generating quality of service display data that presents the quality of service for the user device and the further quality of service for the other device(s), and providing the quality of service display data. The user device can display the quality of service display data in a relative quality of service indicator.

In some embodiments, the computer-executable instructions, when executed by the processor, can cause the processor to perform operations further including receiving, at the processor, opt-in data associated with the user device. In some embodiments, the opt-in data can indicate that the user device should receive quality of service enhancement offers. In some embodiments, the computer-executable instructions, when executed by the processor, can cause the processor to perform operations further including determining, based on the quality of service data, communications characteristics for a communications link associated with the user device; comparing the communications characteristics for the communications link to predefined values; and determining, based on the comparing, that the quality of service associated with the sector is degraded.

In some embodiments, the relative quality of service indicator can include a first representation that depicts the quality of service for the user device; and a second representation that depicts the further quality of service for the other device(s). In some embodiments, the relative quality of service indicator can include an icon. In some embodiments, the quality of service data is received from a network element associated with the sector. The sector can include a portion of a cell of a cellular network.

According to yet another aspect, a method is disclosed. The method can include obtaining, by a processor that executes a quality of service application, quality of service data for a sector that is serving a user device; and in response to determining that a quality of service associated with the sector is degraded, providing, by the processor, an offer to the user device. The offer can include an offer to upgrade the quality of service for the user device. The method also can include in response to detecting acceptance of the offer, triggering, by the processor, enhancement of the quality of service for the user device; and collecting, by the processor, quality of service data for the sector. The quality of service data can represent the quality of service for the user device and a further quality of service for another device or other devices located in the sector. The method also can include generating, by the processor, quality of service display data that can present the quality of service for the user device and the further quality of service for the other device(s); and providing, by the processor and to the user device, the quality of service display data. The user device can display the quality of service display data in a relative quality of service indicator.

In some embodiments, the method also can include receiving, at the processor, opt-in data associated with the user device. The opt-in data can indicate that the user device should receive quality of service enhancement offers. In some embodiments, the method also can include determining, based on the quality of service data, communications characteristics for a communications link associated with the user device; comparing the communications characteristics for the communications link to predefined values; and determining, based on the comparing, that the quality of service associated with the sector is degraded.

In some embodiments, the relative quality of service indicator can include a first representation that depicts the quality of service for the user device; and a second representation that depicts the further quality of service for the other device(s). In some embodiments, the relative quality of service indicator can include an icon. In some embodiments, the quality of service data is received from a network element associated with the sector. The sector can include a portion of a cell of a cellular network.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
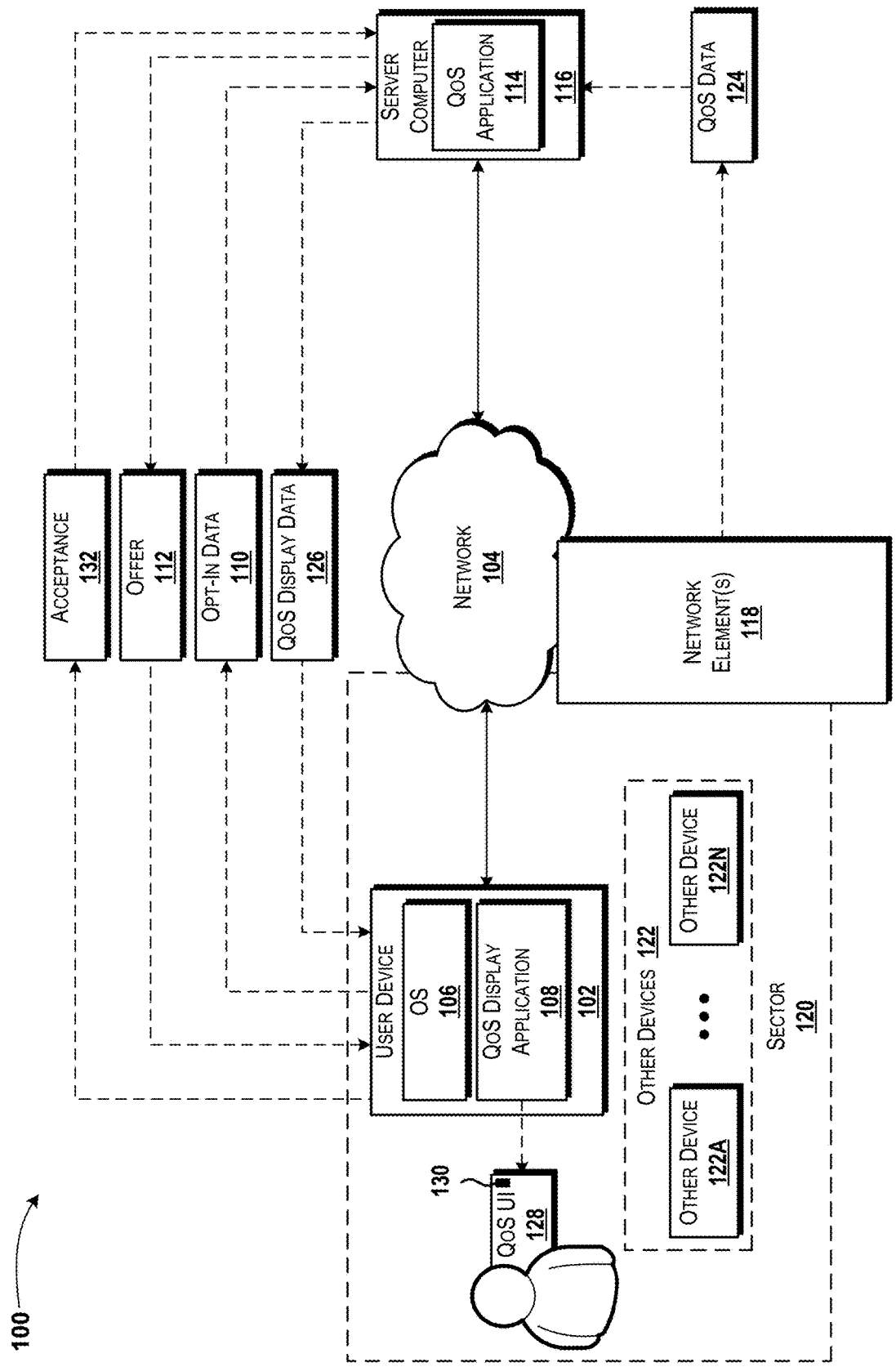
FIG. 1 is a system diagram illustrating an illustrative operating environment for various embodiments of the concepts and technologies described herein.

The following detailed description is directed to generating and providing relative quality of service indicator. A user device may be registered to receive offers for enhancing, upgrading, improving, or otherwise modifying or changing a quality of service associated with the user device. For example, the user device may opt-in to receive offers and may provide opt-in data to a quality of service application or other application, service, module, or the like. At some time, a user device may be located within a sector or other portion of a communications network such as the network. A service such as a quality of service application may receive the quality of service data from one or more network elements associated with the sector. The quality of service application can analyze the quality of service data and determine, based upon the quality of service data, various communications characteristics (e.g., latency of a data link, an uplink speed for the data link, a downlink speed for the data link, a voice quality, combinations thereof, or the like) or other aspects of quality of service for the user device at the sector.

In some embodiments, the quality of service application can compare the determined communications characteristics to various stored values, levels, or the like, to determine if quality of service at the sector is degraded. If the quality of service application determines that a quality of service at the sector is degraded, the quality of service application can provide an offer to the user device. The offer, as explained above, can include an offer to enhance, improve, upgrade, and/or otherwise modify or change the quality of service for the user device. If the offer is accepted at the user device, the user device can inform the quality of service application.

In response to determining that the offer has been accepted, the quality of service application can trigger enhancement, improvement, upgrading, and/or other modifications of or to the quality of service for the user device. The quality of service application also can periodically collect quality of service data associated with the sector to determine if the quality of service has been upgraded and to generate a quality of service display for the user device. The quality of service application also can generate quality of service display data. The quality of service display data can represent measurable aspects of quality of service for the user device and the one or more other device(s) located at the sector.

The quality of service application can send the quality of service display data to the user device. The user device can generate and present a quality of service user interface. The quality of service user interface can include at least one relative quality of service indicator. The relative quality of service indicator can provide the user or other entity associated with the user device with context for his or her quality of service information. Thus, the relative quality of service indicator can compare the quality of service information associated with the user device with quality of service information associated with the one or more other device(s) in the sector.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for generating and providing relative quality of service indicators will be described, according to an illustrative embodiment. The operating environment 100 shown in FIG. 1 includes a user device 102. The user device 102 can operate in communication with and/or as part of a communications network ("network") 104.

According to various embodiments, the functionality of the user device 102 may be provided by one or more mobile telephones, laptop computers, smartphones, tablet computers, slate computers, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. One example embodiment of an architecture for the user device 102 is illustrated and described in detail below with reference to FIG. 7. It should be understood that this embodiment is illustrative, and should not be construed as being limiting in any way.

The user device 102 can execute an operating system 106 and one or more application programs such as, for example, a quality of service display application (labeled "QoS display application" in FIG. 1) 108. The operating system 106 can include a computer program that controls the operation of the user device 102. The quality of service display application 108 can include an executable program that is configured to execute on top of the operating system 106 to provide various functions as illustrated and described herein for generating and providing relative quality of service indicators.

In particular, the quality of service display application 108 can be configured to generate opt-in data 110. The opt-in data 110 can indicate that an entity associated with the user device 102 (e.g., a user, an account, or the like) has opted in to receive one or more offer for quality of service enhancements (labeled "offer") 112. The offer 112 can include an offer for one or more options to prioritize communications (e.g., data communications, voice communications, or the like). Thus, the offer 112 can provide an option to enhance prioritization of, reduce the price of, and/or otherwise improve communications associated with the user device 102. As will be explained in more detail herein, the improvement and/or enhancement of quality of service can be an improvement that is measured relative to other communications in a designated area or portion of a network 104.

More particularly, various embodiments of the network 104 can include cellular networks that can support prioritization of data and/or other communications. Various embodiments of the concepts and technologies described herein can support prioritization of communications by user, device, account, address, or the like, and this prioritization can be offered to a device, user, or the like by way of the offers 112. It should be understood that this example is illustrative and therefore should not be construed as being limiting in any way.

Thus, the opt-in data 110 can indicate that an entity associated with the user device 102 has opted in to receive offers of quality of service enhancement (e.g., prioritization of communications). The user device 102 can be configured to provide the opt-in data 110 to a quality of service application 114 or other service, module, or application. In some embodiments, the quality of service application 114 can be executed by a server computer 116 or other computing device.

The quality of service application 114 can be configured to receive and store the opt-in data 110 for any number of users, accounts, and/or other entities. Thus, while not shown in FIG. 1, it should be understood that the opt-in data 110 for multiple users, devices, and/or other entities can be stored at a data storage device such as a disk drive, server, database, or the like, which can be located at the server computer 116 and/or remotely located relative to the server computer 116. The quality of service application 114 also can include a module, routine, or other instructions for providing a quality of service display generator. Additional functionality of the quality of service display application 108 and the quality of service application 114 will be described in more detail below after introducing additional aspects of the operating environment 100.

The operating environment 100 also can include any number of network elements 118. The network elements 118 can include one or more of the network elements illustrated and described herein with reference to FIG. 5, for example. Thus, it can be appreciated that the network elements 118 can include various types of hardware and/or software for supporting communications at or near any portion of the network 104. In the illustrated embodiment, the network elements 118 can include hardware and software for supporting communications over a geographic area that can include a sector 120 or other portion of a communications network such as the network 104. It should be understood that this example is illustrative and therefore should not be construed as being limiting in any way.

According to various embodiments of the concepts and technologies described herein, the sector 120 shown in FIG. 1 can include a sector 120 that is associated with the user device 102. Thus, for example, a sector antenna can serve the sector 120 and any devices located in a region served by that sector 120. As shown in FIG. 1, the user device 102 and multiple other devices 122A-N (hereinafter collectively and/or generically referred to as "other devices 122") can be located in an area served by the sector 120. It should be understood that this example is illustrative and therefore should not be construed as being limiting in any way.

According to various embodiments of the concepts and technologies described herein, the network elements 118 can collect information associated with the sector 120. In particular, the network elements 118 can collect information from one or more radios, radio elements, controllers, controller elements, combinations thereof, or the like. The information collected by the network elements 118 can include, for example, data that identifies a number of registered users attached to hardware associated with the sector 120, data that identifies a number of active users associated with the sector 120 (e.g., users that are in an active communications session with hardware associated with the sector 120), data that identifies one or more performance characteristics of links supported by the sector 120 (e.g., latency of data links, call quality associated with the sector 120, data link upload and/or download speeds associated with the sector 120, combinations thereof, or the like), data that identifies prioritization associated with the sector 120, combinations thereof, or the like.

The network elements 118 can be configured to collect these and/or other data and to provide the data to the server computer 116 as quality of service data (labeled "QoS data" in FIG. 1) 124. The network elements 118 can be configured to provide the quality of service data 124 to the server computer 116 at various intervals, upon request from the server computer 116, when changes to any of the information represented by the data occurs, and/or at other times. The quality of service application 114 can be configured to use the quality of service data 124 as illustrated and described herein in more detail.

In particular, the quality of service application 114 can be configured to analyze the quality of service data 124 and determine, based upon the analysis, if an offer 112 should be generated. For example, the quality of service application 114 can detect a number of active users, a number of registered users, one or more characteristics of communications links, or the like via analysis of the quality of service data 124. The quality of service application 114 can determine that this value meets or exceeds a value that, if met or exceeded, results in a determination that an offer 112 should be generated (e.g., that enhancement of quality of service for the user device 102 or other device 122 located in the sector 120 will result in a noticeable difference in quality of service for the user device 102 or other device 122).

If the quality of service application 114 determines that an offer 112 should be generated, the quality of service application 114 can generate the offer 112 and send the offer to the user device 102. The offer 112 can offer an enhanced quality of service to the user device 102. If the offer 112 is accepted by the user device 102, the quality of service application 114 can be configured to generate quality of service display data 126. The quality of service display data 126 can include information describing quality of service for the user device 102 relative to the other devices 122.

The quality of service display data 126 generated by the quality of service application 114 can include information that defines various characteristics of communications associated with the user device 102 and the other devices 122. According to various embodiments of the concepts and technologies described herein, the quality of service display data 126 can include information that represents active and registered users on the sector 120, various characteristics (latency, uplink speed, downlink speed, bandwidth) associated with data and/or voice communications for the user device 102, various characteristics (latency, uplink speed, downlink speed, bandwidth) associated with data and/or voice communications for the other devices 122, combinations thereof, or the like. These data can be provided to the user device 102 as the quality of service display data 126. In some embodiments, the quality of service display data 126 can include data that, when rendered by the user device 102, provides a user interface ("UI") that includes one or more relative quality of service indicators.

In particular, the quality of service display application 108 executed by the user device 102 can obtain the quality of service display data 126. In some embodiments of the concepts and technologies described herein, the quality of service display application 108 can render the quality of service display data 126 to present a quality of service display user interface (labeled "QoS UI" in FIG. 1) 128. In some other embodiments of the concepts and technologies described herein, the quality of service display application 108 can generate the quality of service user interface 128 based on the quality of service display data 126. Thus, it can be appreciated that in some embodiments the quality of service application 114 can generate the quality of service display data 126 as data that, when rendered by the quality of service display application 108, presents the quality of service user interface 128 while in some other embodiments the quality of service application 114 can generate the quality of service display data 126 as data that is used by the quality of service display application 108 to generate the quality of service user interface 128 illustrated and described herein.

Regardless of how the quality of service user interface is generated (e.g., by the quality of service display application 108 or by the quality of service application 114), the quality of service user interface 128 can include a relative quality of service indicator 130. The relative quality of service indicator 130 can provide the user device 102 with information that depicts how a quality of service associated with the user device 102 compares to the other devices 122 in the sector 120. Some example embodiments of the quality of service user interface 128 will be illustrated and described in more detail below with reference to FIGS. 4A-4D.

In practice, a user device 102 may be registered to receive offers 112 for enhancing, upgrading, improving, or otherwise modifying or changing a quality of service associated with the user device 102. For example, the user device 102 may create opt-in data 110 that indicates that the user device 102 should be provided with the offers 112. The opt-in data 110 can be provided to a quality of service application 114 or other application, service, module, or the like (e.g., a quality of service application that may be executed by device such as the server computer 116).

At some time, a user device 102 may be located within a sector 120 or other portion of a communications network such as the network 104. The server computer 116 or a service such as the quality of service application 114 may receive the quality of service data 124 from one or more network elements 118 associated with the sector 120. According to various embodiments, the network elements 118 can include reporting and/or monitoring hardware and software that can report various quality of service information to the server computer 116 at various times.

The quality of service application 114 can analyze the quality of service data 124 and determine, based upon the quality of service data 124, various communications characteristics (e.g., latency of a data link, an uplink speed for the data link, a downlink speed for the data link, a voice quality, combinations thereof, or the like) or other aspects of quality of service for the user device 102 at the sector 120. In some embodiments, the quality of service application 114 can compare the determined communications characteristics to various stored values, levels, or the like, to determine if quality of service at the sector 120 is degraded (as defined by the values, levels, or the like). Thus, it can be appreciated that the quality of service application 114 can store definitions of degraded quality of service such as lower limits for uplink speed, downlink speed, call quality, or the like; and upper limits for latency, or the like. It should be understood that this example is illustrative and therefore should not be construed as being limiting in any way.

If the quality of service application 114 determines that a quality of service at the sector 120 is degraded, the quality of service application 114 can provide an offer 112 to the user device 102. The offer 112, as explained above, can include an offer to enhance, improve, upgrade, and/or otherwise modify or change the quality of service for the user device 102. The user device 102 can be configured to automatically accept any offer for improved quality of service (e.g., a preference, setting, network setting, account setting, or the like), in some embodiments. In some other embodiments, the user device 102 can be configured to present the offer 112 to a user or other entity to determine if the offer 112 should be accepted. If the offer 112 is accepted at the user device 102 (either by a user, other entity, or automatically), the user device 102 can inform the quality of service application 114. In some embodiments of the concepts and technologies described herein, the user device 102 can generate acceptance data 132. The acceptance data 132 can indicate, to the quality of service application 114, that the user device has accepted the offer 112.

In response to determining that the offer 112 has been accepted, the quality of service application 114 can trigger enhancement, improvement, upgrading, and/or other modifications of or to the quality of service for the user device 102. The quality of service application 114 also can periodically collect quality of service data 124 associated with the sector 120 to determine if the quality of service has been upgraded and to generate a quality of service display for the user device 102.

After collecting the quality of service data 124, the quality of service application 114 (or a quality of service display generator) can generate quality of service display data 126. The quality of service display data 126 can represent communications characteristics or other measurable aspects of quality of service. The quality of service display data 126 can represent the measurable aspects of quality of service for the user device 102 and the one or more other device(s) 122 located at the sector 120. According to some embodiments of the concepts and technologies described herein, the quality of service display data 126 includes measurable aspects of quality of service for at least the user device 102 and one other device 122. It should be understood that this example is illustrative and therefore should not be construed as being limiting in any way.

The quality of service application 114 can send the quality of service display data 126 to the user device 102. In some embodiments of the concepts and technologies described herein, the quality of service display data 126 can be configured as renderable data that can be rendered by the user device 102 without further analysis and/or operations. In some other embodiments of the concepts and technologies described herein, the quality of service display data 126 can be configured as data points that are then analyzed and/or operated on to create a visual display of the quality of service for the user device 102 and the other devices 122 at the sector 120. In these and other embodiments, the user device 102 can generate and present a quality of service user interface 128. The quality of service user interface 128 can include at least one relative quality of service indicator 130.

The relative quality of service indicator 130 can provide the user or other entity associated with the user device 102 with context for his or her quality of service information.

Thus, the relative quality of service indicator 130 can compare the quality of service information associated with the user device 102 with quality of service information associated with the one or more other device(s) 122 in the sector 120. According to various embodiments of the concepts and technologies described herein, the relative quality of service indicator 130 can be provided as an icon that the user or other entity can interact with to get additional details relating to the quality of service. These and other aspects of the relative quality of service indicator 130 will be illustrated and described in more detail below, particularly with reference to FIGS. 4A-4D.

FIG. 1 illustrates one user device 102, one network 104, one server computer 116, one instance of network elements 118, one sector 120, and two other devices 122. It should be understood, however, that various implementations of the operating environment 100 can include zero, one, or more than one user device 102; zero, one, or more than one network 104; zero, one, or more than one server computer 116; zero, one, or more than one instance of network elements 118; zero, one, or more than one sector 120; and/or zero, one, two, or more than two other devices 122. As such, the illustrated embodiment should be understood as being illustrative, and should not be construed as being limiting in any way.

Figure 2:
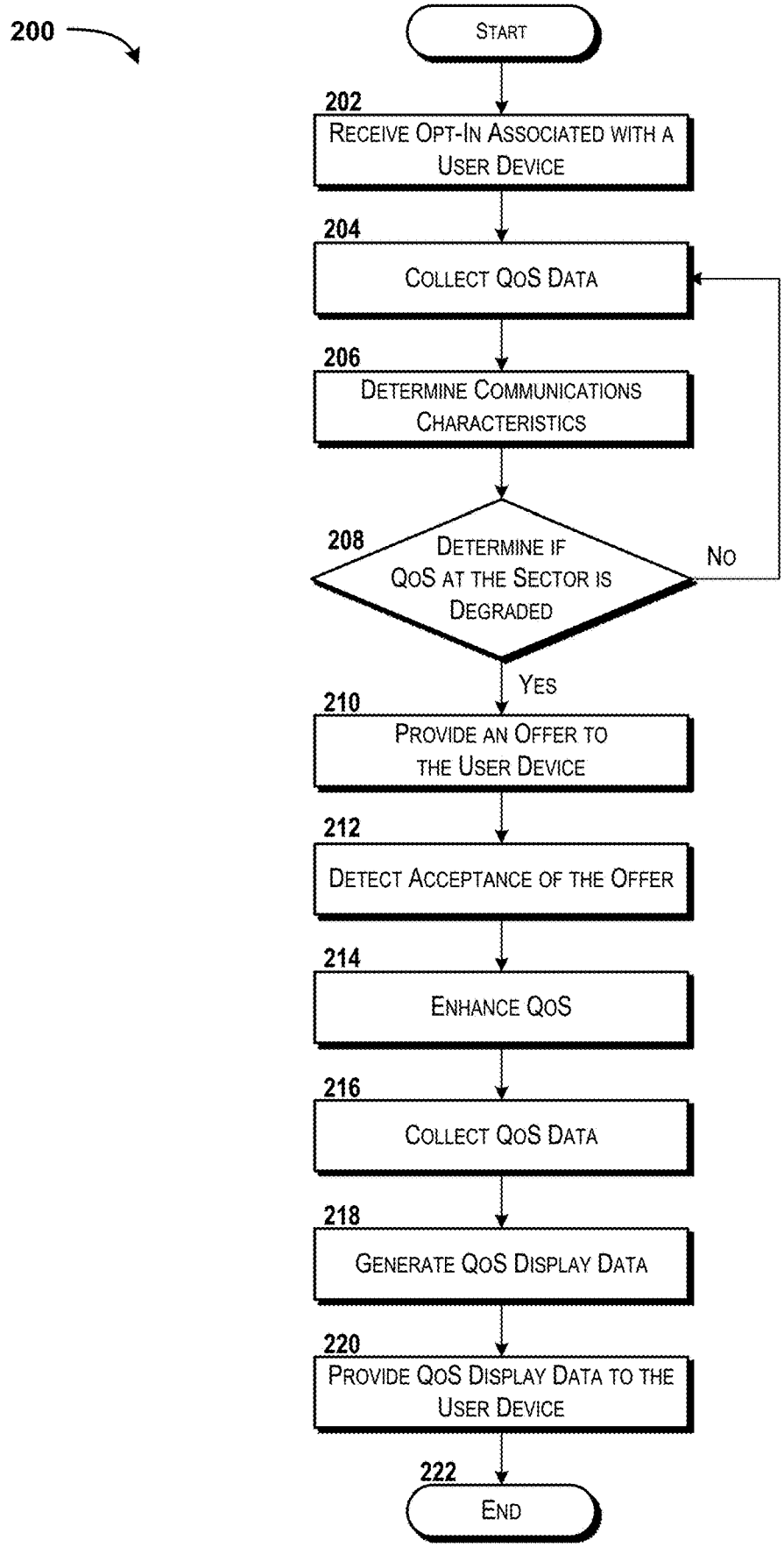
FIG. 2 is a flow diagram showing aspects of a method for generating and providing quality of service display data that includes a relative quality of service indicator, according to an illustrative embodiment of the concepts and technologies described herein.

Turning now to FIG. 2, aspects of a method 200 for generating and providing quality of service display data that includes a relative quality of service indicator will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the server computer 116, and/or other devices or systems to perform one or more operations and/or causing the processor to direct other components of the computing system or device to perform one or more of the operations.

For purposes of illustrating and describing the concepts of the present disclosure, the method 200 disclosed herein is described as being performed by the server computer 116 via execution of one or more software modules such as, for example, the quality of service application 114. It should be understood that additional and/or alternative devices and/or network nodes can provide the functionality described herein via execution of one or more modules, applications, and/or other software including, but not limited to, the quality of service application 114. Thus, the illustrated embodiment is illustrative, and should not be viewed as being limiting in any way.

The method 200 begins at operation 202. At operation 202, the server computer 116 can receive an opt-in data 110 associated with a device such as, for example, the user device 102. As explained above with reference to FIG. 1, the opt-in data 110 can indicate that the user device 102 should receive notifications such as the offer 112 when enhanced quality of service is available. According to various embodiments of the concepts and technologies described herein, the opt-in data 110 can be generated and/or provided when a user or other entity purchases a quality of service upgrade option, when the user device 102 registers with the network 104, when the user device 102 enters the sector 120, and/or at other times. Thus, while the opt-in data 110 is illustrated herein as being provided by the user device 102, it should be understood that the opt-in data 110 can occur at other times and/or via other devices. Regardless of how the opt-in data 110 occurs, the user device 102 can opt-in to receiving offers or notifications that quality of service enhancements are available.

From operation 202, the method 200 can proceed to operation 204. At operation 204, the server computer 116 can obtain quality of service data 124 for a portion of the network 104 associated with the user device 102. According to various embodiments of the concepts and technologies described herein (e.g., the embodiment shown in FIG. 1), the server computer 116 can obtain quality of service data 124 for the sector 120. The quality of service data 124 can indicate numbers of registered users, numbers of active users, and communications characteristics of one more links associated with devices (e.g., the user device 102 and the other devices 122) that are served by the sector 120.

From operation 204, the method 200 can proceed to operation 206. At operation 206, the server computer 116 can determine communications characteristics associated with one or more portions of the network 104. In particular, in operation 206 the server computer 116 can determine communications characteristics of communications links for devices within the sector 120 (or other portion of the network 104 that serves the user device 102). According to various embodiments, the server computer 116 determines, in operation 206, communications characteristics of communications links for the user device 102, which can be located in the sector 120. It should be understood that this example is illustrative and therefore should not be construed as being limiting in any way.

From operation 206, the method 200 can proceed to operation 208. At operation 208, the server computer 116 can determine if a quality of service at the sector is degraded.

According to some embodiments of the concepts and technologies described herein, the server computer 116 may determine, in operation 208, if one or more communications characteristic associated with the user device 102 meets, falls below, or exceeds a defined value. It should be appreciated that the server computer 116 can determine that quality of service at the sector 120 is degraded in additional and/or alternative manners. As such, this example is illustrative and should not be construed as being limiting in any way.

The defined value can correspond, for example, to a threshold value, a range, or other value. The server computer 116 can be configured to determine that an offer 112 should be made to the user device 102 if one or more communications characteristic meets, falls below, or exceeds the defined value. If the server computer 116 determines, in operation 208, that the communications characteristic does not meet, fall below, or exceed some defined value, the method 200 can return to operation 204, and the server computer 116 can again obtain the quality of service data 124. Thus, operations 202-208 can be repeated until the server computer 116 determines, in any iteration of operation 208, that a quality of service at the sector 120 is degraded. If the server computer 116 determines, in any iteration of operation 208, that a quality of service at the sector 120 is degraded, the method 200 can proceed to operation 210.

At operation 210, the server computer 116 can provide an offer (e.g., the offer 112) to the user device 102. The offer provided to the user device 102 in operation 210 can indicate that an upgraded, enhanced, improved, or otherwise changed quality of service is available. According to various embodiments of the concepts and technologies described herein, the offer provided to the user device 102 can indicate that the user device 102 can upgrade, enhance, or improve its quality of service. For example, the offer provided to the user device 102 can indicate that quality of service for the user device 102 can be upgraded, enhanced, or improved to decrease latency of one or more data link, to increase uplink speed of the one or more data link, to increase downlink speed of the one or more data link, to improve a call quality metric, to grant data packets generated by the user device 102 with an improved (e.g., increased) priority relative to a default priority, combinations thereof, or the like. Although not shown in FIG. 2, the offer 112 can be presented at the user device 102 (e.g., presented on a screen display), though this is not necessarily the case as will be explained in more detail below.

From operation 210, the method 200 can proceed to operation 212. At operation 212, the server computer 116 can detect an acceptance of the offer provided to the user device 102 in operation 210. According to some embodiments of the concepts and technologies described herein, the acceptance obtained or detected in operation 212 can be generated in response to user input at the user device 102 (e.g., selection of an option on a user interface, or the like). In some other embodiments, the user device 102 can be configured to automatically accept offers such as the offer made in operation 210. For example, a preference or setting associated with the user device 102 can indicate that any offer for an enhanced quality of service should be accepted, and as such, there may be no user or application input associated with the acceptance of the offer. As such, it should be understood that the acceptance illustrated in operation 212 can be obtained during setup of the user device 102, registration of the user device 102 with the network 104, ordering of a service for enhanced quality of service and/or quality of service displays, combinations thereof, or the like.

From operation 212, the method 200 can proceed to operation 214. At operation 214, the server computer 116 can trigger enhancement, improvement, and/or upgrading of the quality of service associated with the user device 102. In some embodiments, the server computer 116 can send a quality of service upgrade instruction to the network 104 and/or the network elements 118 as shown in FIG. 1. In some other embodiments, server computer 116 can implement the quality of service upgrade and/or trigger instructions to various other devices, applications, services, elements, or the like to trigger or initiate the upgrading, enhancement, and/or improvement to the quality of service. It should be understood that these examples are illustrative and therefore should not be construed as being limiting in any way.

From operation 214, the method 200 can proceed to operation 216. At operation 216, the server computer 116 can obtain quality of service data 124 for a portion of the network 104 associated with the user device 102. In some embodiments, the network elements 118 that serve a particular portion of the network 104 (e.g., the sector 120) can provide the quality of service data 124 to the server computer 116, though this is not necessarily the case. According to various embodiments of the concepts and technologies described herein (e.g., the embodiment shown in FIG. 1), the server computer 116 can obtain quality of service data 124 for the sector 120. Thus, it can be appreciated that the operation 216 can be substantially similar to operation 204, though this is not necessarily the case.

The quality of service data 124 can indicate numbers of registered users, numbers of active users, and communications characteristics of one or more links associated with devices (e.g., the user device 102 and the other devices 122) that are served by the sector 120. The quality of service data 124 obtained in operation 216 therefore can provide not only information associated with the user device 102, but also for the other devices 122 that are served by the sector 120. It should be understood that this example is illustrative and therefore should not be construed as being limiting in any way.

From operation 216, the method 200 can proceed to operation 218. At operation 218, the server computer 116 can generate quality of service display data 126. According to various embodiments of the concepts and technologies described herein, the quality of service display data 126 can represent various communications characteristics for two or more devices served by the portion of the network 104 associated with the quality of service data 124 obtained in operation 216. For example, the quality of service display data 126 can represent various measurable aspects of quality of service for the user device 102 and the one or more other device 122 located at the sector 120.

Thus, for example, the quality of service display data 126 can represent a latency associated with a data link of the user device 102, a latency associated with one or more data link of one or more other device 122, a downlink speed associated with a data link of the user device 102, a downlink speed associated with one or more data link of one or more other device 122, an uplink speed associated with a data link of the user device 102, an uplink speed associated with one or more data link of one or more other device 122, a call quality associated with the user device 102, a call quality associated with one or more other device 122, combinations thereof, or the like. Because the quality of service display data 126 can represent additional and/or alternative representations of quality of service at the sector 120 or other portion of the network 104, it should be understood that these examples are illustrative and therefore should not be construed as being limiting in any way.

From operation 218, the method 200 can proceed to operation 220. At operation 220, the server computer 116 can provide the quality of service display data 126 generated in operation 218 to the user device 102. Although not shown in FIG. 2, the user device 102 can use the quality of service display data 126 to generate the quality of service user interface 128 and/or the relative quality of service indicator 130 as explained in more detail herein. It should be understood that this example is illustrative and therefore should not be construed as being limiting in any way.

From operation 220, the method 200 can proceed to operation 222. The method 200 can end at operation 222.

Figure 3:
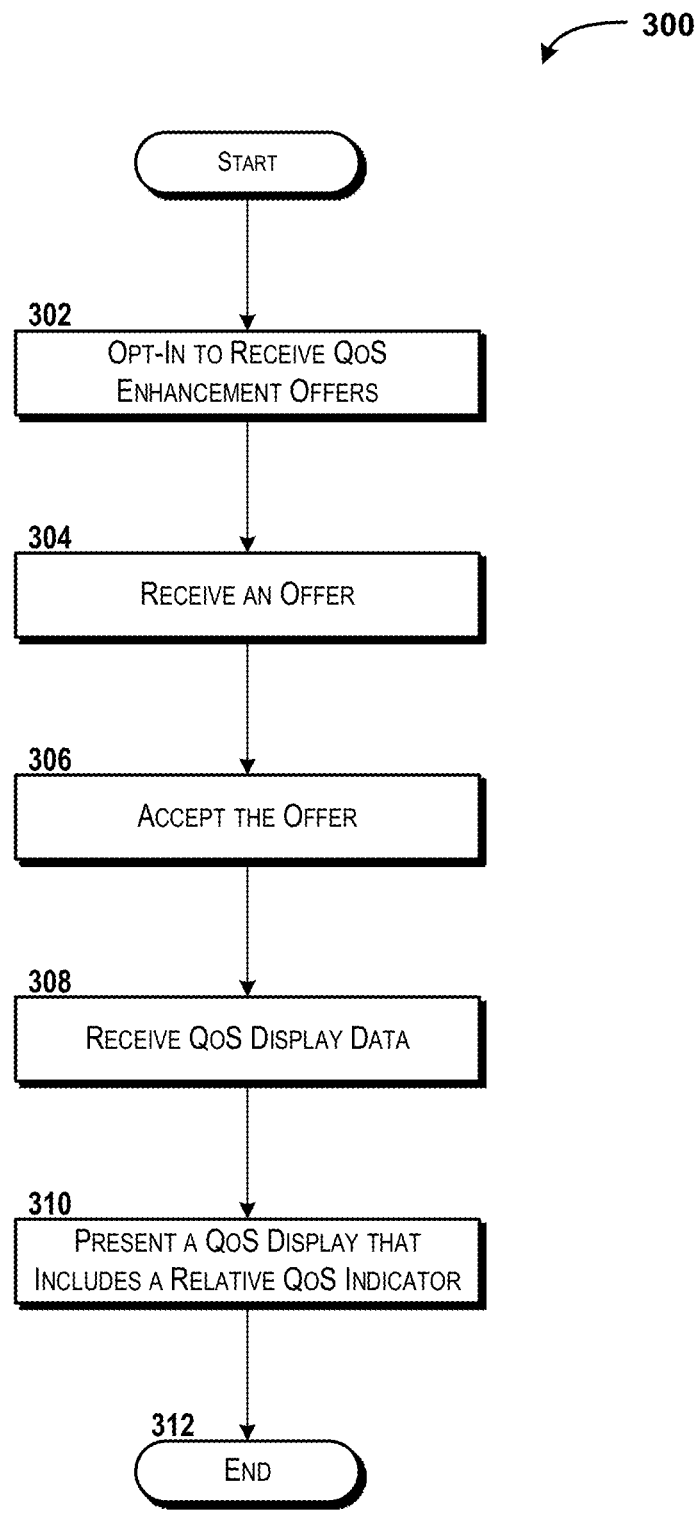
FIG. 3 is a flow diagram showing aspects of a method for providing a quality of service display that includes a relative quality of service indicator, according to an illustrative embodiment of the concepts and technologies described herein.

Turning now to FIG. 3, aspects of a method 300 for providing a quality of service display that includes a relative quality of service indicator will be described in detail, according to an illustrative embodiment. For purposes of illustrating and describing the concepts of the present disclosure, the method 300 disclosed herein is described as being performed by the user device 102 via execution of one or more software modules such as, for example, the quality of service display application 108. It should be understood that additional and/or alternative devices and/or network nodes can provide the functionality described herein via execution of one or more modules, applications, and/or other software including, but not limited to, the quality of service display application 108. Thus, the illustrated embodiment is illustrative, and should not be viewed as being limiting in any way.

The method 300 begins at operation 302. At operation 302, the user device 102 can opt-in to receive quality of service enhancement, improvement, and/or upgrade offers such as the offers 112 illustrated and described herein. As explained above, the opt-in illustrated in operation 302 can correspond to the opt-in data 110 illustrated and described herein. As such, the opt-in can indicate that the user device 102 should receive notifications and/or offers (e.g., offer 112) when enhanced quality of service is available. According to various embodiments of the concepts and technologies described herein, the opt-in can be generated and/or provided when a user or other entity purchases a quality of service upgrade option, when the user device 102 registers with the network 104, when the user device 102 enters the sector 120, and/or at other times. Regardless of how and/or when the opt-in illustrated in operation 302 occurs, the user device 102 can opt-in to receive offers or notifications that quality of service enhancements are available.

From operation 302, the method 300 can proceed to operation 304. At operation 304, the user device 102 can receive an offer. The offer received in operation 304 can include a quality of service enhancement offer such as the offer 112 illustrated and described herein. The offer 112 received in operation 304 can indicate that a quality of service associated with the user device 102 can be upgraded, improved, enhanced, and/or otherwise modified. The offer 112 is illustrated and described herein in detail.

From operation 304, the method 300 can proceed to operation 306. At operation 306, the user device 102 can accept the offer received in operation 304. As illustrated and described above, the user device 102 can be configured to automatically accept the offer received in operation 304. In some embodiments, the user device 102 can present a user interface to obtain a selection of an option to accept the offer or to obtain a selection of an option to ignore or not to accept the offer. Thus, it should be understood that the user device can be configured to present a display to obtain a selection and/or acceptance of the offer in operation 306, though this is not separately illustrated in FIG. 3.

From operation 306, the method 300 can proceed to operation 308. At operation 308, the user device 102 can receive quality of service display data 126 from the server computer 116. The quality of service display data 126 received in operation 308 can include representations of various quality of service indicators for the user device 102 and at least one of the other devices 122. As explained above in detail, the quality of service display data 126 can be provided as visual display data that is rendered by the user device 102 or as data that is analyzed and/or operated on by the user device 102 to create a rendered display.

From operation 308, the method 300 can proceed to operation 310. At operation 310, the user device 102 can present a quality of service display. In some embodiments, the quality of service display presented in operation 310 can correspond to the quality of service user interface illustrated and described herein with reference to FIG. 1. Thus, it can be appreciated that the quality of service display generated in operation 310 can include a relative quality of service indicator 130 as illustrated and described herein with reference to FIG. 1. Some example embodiments of the relative quality of service indicator 130 are illustrated and described herein with reference to FIGS. 4A-4D. It should be understood that these examples are illustrative and therefore should not be construed as being limiting in any way.

From operation 310, the method 300 can proceed to operation 312. The method 300 can end at operation 312.

Figure 4A:
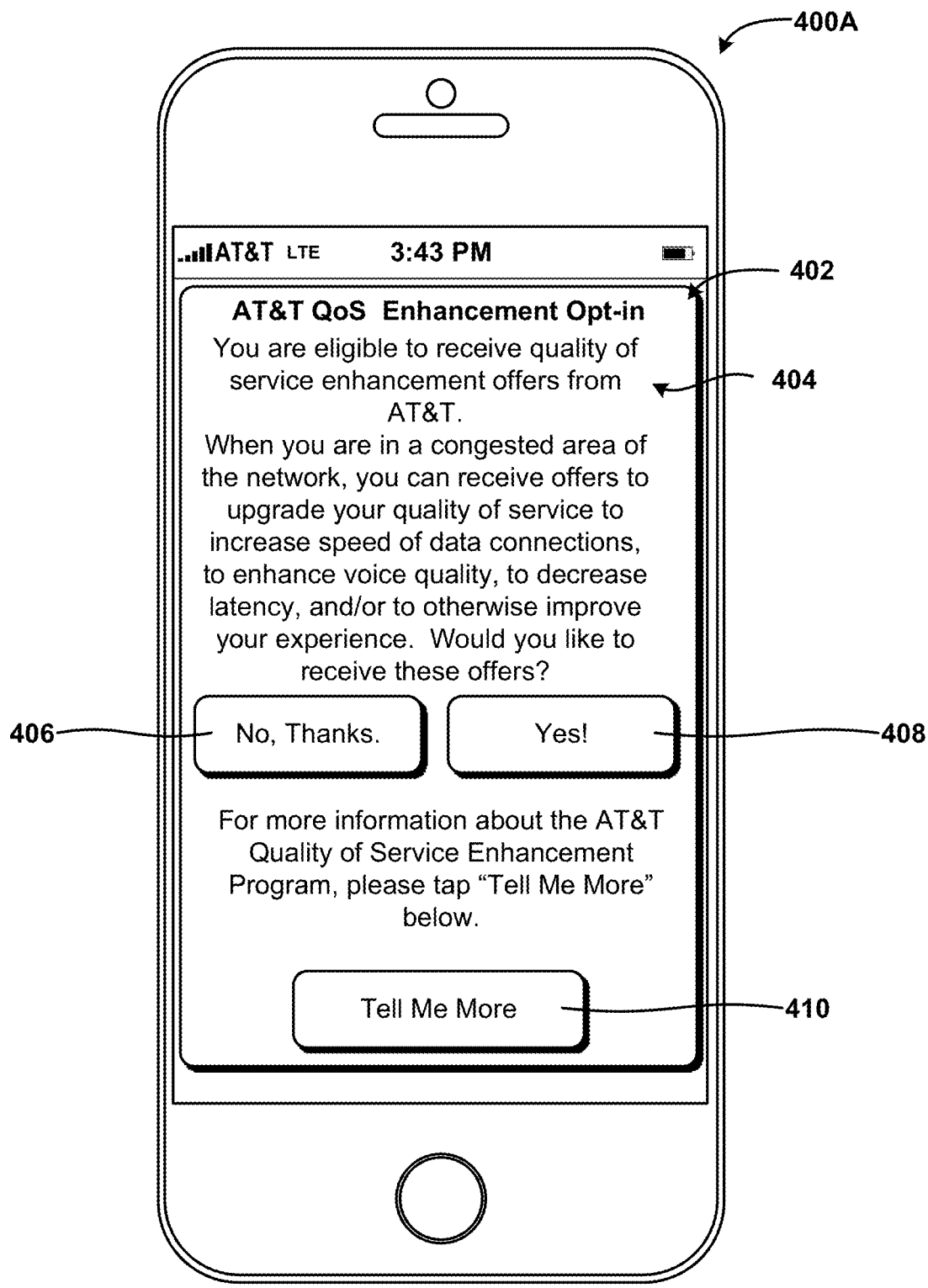
FIGS. 4A-4D are user interface diagrams showing various screen displays for generating and providing relative quality of service indicators, according to some illustrative embodiments of the concepts and technologies described herein.

FIGS. 4A-4D are user interface ("UI") diagrams showing aspects of UIs for using and/or interacting with the quality of service application 114 and/or the quality of service display application 108, according to some illustrative embodiments. FIG. 4A shows an illustrative screen display 400A. According to some embodiments of the concepts and technologies described herein, the screen display 400A can be generated by a device such as the user device 102 via interactions with the quality of service application 114 and/or the quality of service display application 108. In particular, according to various embodiments, the user device 102 can generate the screen display 400A and/or other screen displays in conjunction with and/or based upon interactions with the quality of service display application 108 described herein, which can be configured to render the screen display 400A using data generated at the user device 102 and/or using data provided by the quality of service application 114. It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

According to various embodiments, the screen display 400A can be presented, for example, when the user device 102 signs up for an enhanced quality of service application, when the user device 102 registers with a network, when a new account is created, or the like. Because the screen display 400A illustrated in FIG. 4A can be displayed at additional and/or alternative times, it should be understood that these examples are illustrative and therefore should not be construed as being limiting in any way.

The screen display 400A can include various menus and/or menu options (not shown in FIG. 4A). The screen display 400A also can include a quality of service enhancement opt-in window 402. The quality of service enhancement opt-in window 402 can be configured to enable a user or other entity associated with the user device 102 to opt-in to receive offers such as the offer 112 illustrated and described herein. As such, it can be appreciated that the quality of service enhancement opt-in window 402 can be used to generate the opt-in data 110 illustrated and described herein. It should be understood that this example is illustrative and therefore should not be construed as being limiting in any way.

The quality of service enhancement opt-in window 402 can include various types of data and/or information that can be included to inform a user or other entity that an option to opt-in to receive offers relating to quality of service is available. Thus, as shown in FIG. 4A, the quality of service enhancement opt-in window 402 can include an opt-in explanation 404. The opt-in explanation 404 can explain the availability of quality of service offers and/or provide information for opting in to receive the offers. Thus, the opt-in explanation 404 can provide a context for the user or other entity to make an opt-in decision relating to offers such as the offer 112. It should be understood that this example is illustrative and therefore should not be construed as being limiting in any way.

The quality of service enhancement opt-in window 402 also can include a UI control 406 to decline the opt-in option. Selection of the UI control 406 can cause the user device 102 to hide the quality of service enhancement opt-in window 402 and/or send data that indicates that the offer of quality of service enhancement has been declined. It can be appreciated that selection of the UI control 406 can cause the user device 102 to generate the opt-in data 110, wherein the opt-in data 110 can indicate that the offer was declined (e.g., an "opt-out" indication). The quality of service enhancement opt-in window 402 also can include a UI control 408 to accept or opt-in to the quality of service enhancement. Thus, for example, the user or other entity can select the UI control 408 to cause the user device 102 to opt-in to the quality of service enhancement offers, to generate the opt-in data 110, wherein the opt-in data indicates the opting in, or the like. Because additional or alternative controls can be included in the quality of service enhancement opt-in window 402, it should be understood that the example embodiment shown in FIG. 4A is illustrative and therefore should not be construed as being limiting in any way.

The quality of service enhancement opt-in window 402 also can include a UI control 410 to obtain more information about the quality of service enhancement functionality and/or how offers can be obtained. Selection of the UI control 410 can cause the user device 102 to present additional and/or alternative information about the quality of service enhancement, rates, billing options, combinations thereof, or the like. Because other types of information can be displayed in response to selection of the UI control 410, it should be understood that these examples are illustrative and therefore should not be construed as being limiting in any way.

Figure 4B:
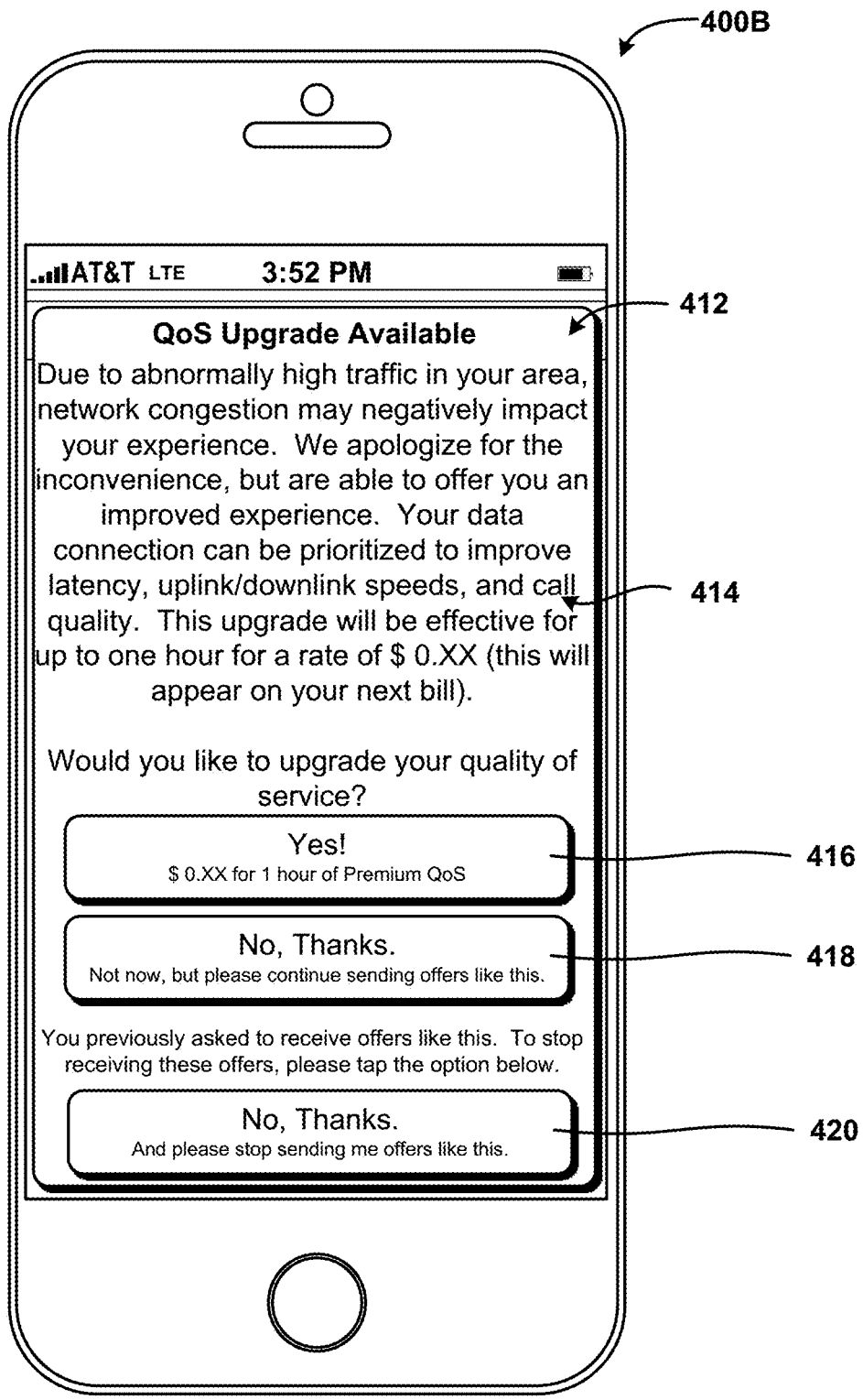

FIG. 4B shows an illustrative screen display 400B. According to some embodiments of the concepts and technologies described herein, the screen display 400B can be generated by a device such as the user device 102 via interactions with the quality of service application 114 and/or the quality of service display application 108. In particular, according to various embodiments, the user device 102 can generate the screen display 400B and/or other screen displays in conjunction with and/or based upon interactions with the quality of service display application 108 described herein, which can be configured to render the screen display 400B using data generated at the user device 102 and/or using data provided by the quality of service application 114. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

According to various embodiments, the screen display 400B can be presented, for example, when an offer 112 is sent to the user device 102, when the user device 102 determines that an upgrade or improvement to quality of service is available, when the quality of service application 114 indicates that an enhanced or improved quality of service is available, when the quality of service display application 108 determines that an offer 112 should be presented at the user device 102, and/or at other times. It can be appreciated that the screen display 400B may be displayed at a user device 102 that has previously opted in to receive offers 112, as illustrated and described herein. Because the screen display 400B illustrated in FIG. 4B can be displayed at additional and/or alternative times, it should be understood that these examples are illustrative and therefore should not be construed as being limiting in any way.

The screen display 400B can include various menus and/or menu options (not shown in FIG. 4B). The screen display 400B also can include a quality of service enhancement offer window 412. The quality of service enhancement offer window 412 can be configured to provide an offer to upgrade, enhance, improve, or otherwise modify or change a quality of service associated with the user device 102 as illustrated and described herein. Thus, as illustrated and described herein, the quality of service enhancement offer window 412 can present an offer 112, which can be sent to the user device 102 at various times.

As shown in FIG. 4B, the quality of service enhancement offer window 412 can include offer text 414. The offer text 414 can explain the offer 112 that is being provided to the user device 102 and/or otherwise explain how quality of service can be modified via interactions with controls included within the quality of service enhancement offer window 412. The offer text 414 also can, but does not necessarily, explain what acceptance of the offer 112 will mean practically to the user device 102. For example, if heavy congestion means an uplink speed (for example) may be increased to only five Megabits per second, a user or other entity may consider this low (and therefore not worth the upgrade). If the offer text 414 indicates, however, that this rate of five Megabits per second exceeds the two Megabits per second currently being experienced by other users on the cell due to the congestion, this offer 112 may be more likely to be accepted. Other examples will be readily apparent from this single illustrative example.

In the illustrated embodiment, the offer text 414 includes an indication that a network congestion has been detected (e.g., the server computer 116 may have determined based upon analysis of the quality of service data 124 that there is congestion at the sector 120 as illustrated and described above), and that the user device 102 can opt to improve a quality of service associated with the user device 102 to improve performance of one or more aspects of a service. The illustrated offer text 414 also can specify a fee for the quality of service upgrade, though this is not necessarily the case. As such, it can be appreciated that any price or fee may or may not be included in the offer text 414. In particular, the upgrade to quality of service may be a paid service, may be a complimentary upgrade, may be offered for free, and/or otherwise may or may not include the charging of a fee. As such, it should be understood that the illustrated offer test 414 is illustrative and therefore should not be construed as being limiting in any way.

The quality of service enhancement offer window 412 also can include a UI control 416. Selection of the UI control 416 can cause the user device 102 to accept the offer 112 presented by way of the quality of service enhancement offer window 412 and/or the offer text 414. Thus, selection of the UI control 416 can cause the user device 102 to send an acceptance of the offer (e.g., the acceptance data 132 illustrated and described in FIG. 1) and/or to otherwise accept the offer 112. Selection of the UI control 416 also can cause the user device 102 to hide the quality of service enhancement offer window 412. It should be understood that this example is illustrative and therefore should not be construed as being limiting in any way.

The quality of service enhancement offer window 412 also can include a UI control 418. Selection of the UI control 418 can cause the user device 102 to reject (or at least not accept) the offer 112 presented by way of the quality of service enhancement offer window 412. Selection of the UI control 418 also can cause the user device 102 to close the quality of service enhancement offer window 412, if desired. Thus, a user or other entity can select the UI control 418 to cause the user device 102 to close the quality of service enhancement offer window 412 and to reject the offer 112, but may indicate that future offers 112 may be provided. It should be understood that this example is illustrative and therefore should not be construed as being limiting in any way.

The quality of service enhancement offer window 412 also can include a UI control 420. Selection of the UI control 420 can cause the user device 102 to reject (or at least not accept) the offer 112 presented by way of the quality of service enhancement offer window 412, similar to the UI control 418, but also can indicate that that future offers 112 should not be provided. As such, the UI control 420 may reject an offer 112 as well as rescind an opt-in as illustrated and described above with reference to FIG. 4A. As such, it can be appreciated that selection of the UI control 420 may cause the user device 102 to generate and/or send opt-in data 110 in addition to rejecting the offer 112 and/or closing the quality of service enhancement offer window 412. Because additional or alternative controls can be included in the quality of service enhancement offer window 412, it should be understood that the example embodiment shown in FIG. 4B is illustrative and therefore should not be construed as being limiting in any way.

Figure 4C:
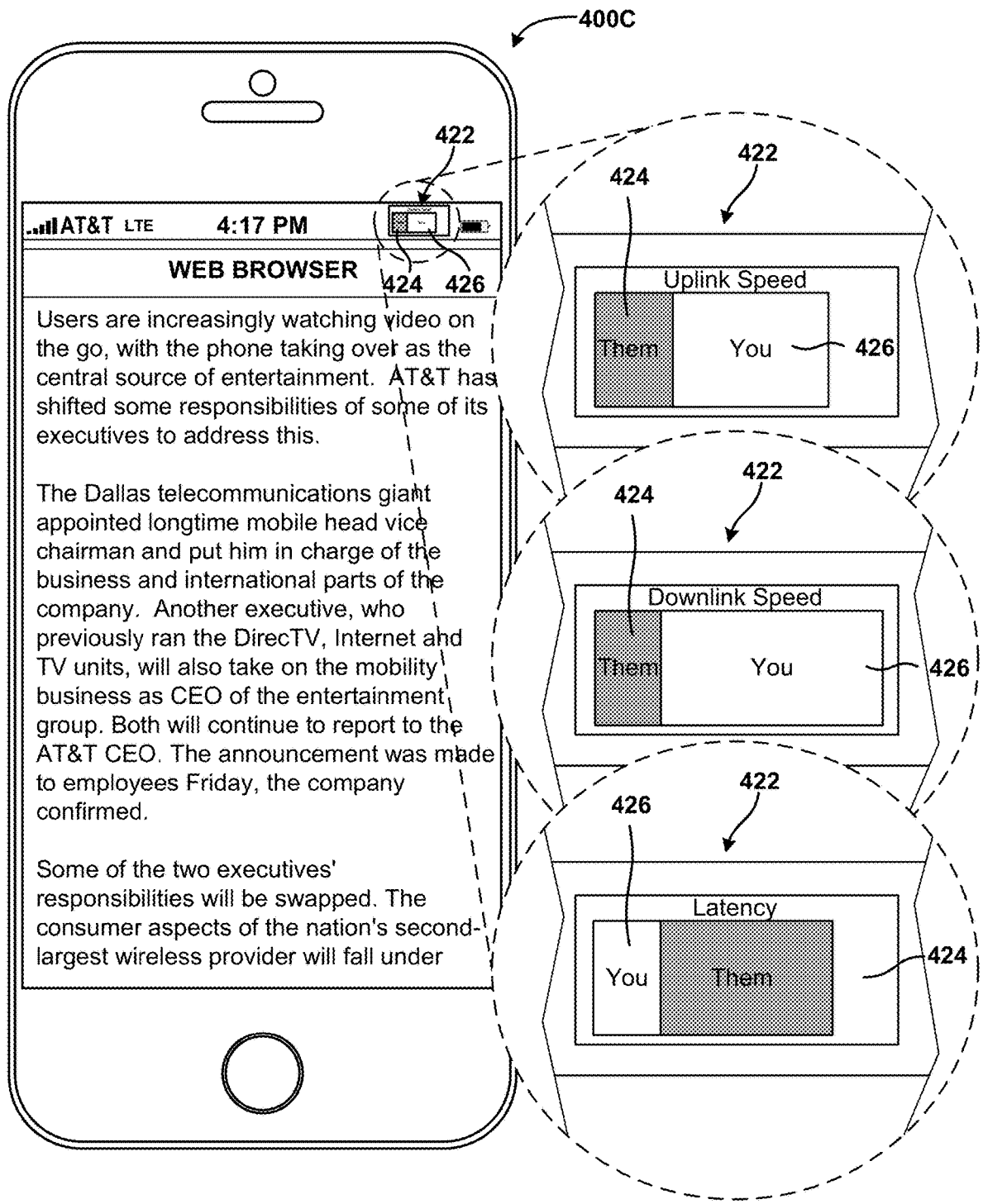

FIG. 4C shows an illustrative screen display 400C. According to some embodiments of the concepts and technologies described herein, the screen display 400C can be generated by a device such as the user device 102 via interactions with the quality of service application 114 and/or the quality of service display application 108. In particular, according to various embodiments, the user device 102 can generate the screen display 400C and/or other screen displays in conjunction with and/or based upon interactions with the quality of service display application 108 described herein, which can be configured to render the screen display 400C using data generated at the user device 102 and/or using data provided by the quality of service application 114. It should be appreciated that the UI diagram illustrated in FIG. 4C is illustrative of one contemplated example of the UIs that can be generated and/or displayed in accordance with the concepts and technologies disclosed herein, and therefore should not be construed as being limited in any way.

According to various embodiments, the screen display 400C can be presented when a user device 102 has accepted an offer 112 to upgrade, enhance, improve, and/or otherwise modify or change a quality of service associated with the user device 102. For example, the screen display 400C may be presented in response to acceptance of an offer 112 as illustrated and described herein. Because the screen display 400C illustrated in FIG. 4C can be displayed at additional and/or alternative times, it should be understood that these examples are illustrative and therefore should not be construed as being limiting in any way.

The screen display 400C can include various menus and/or menu options (not shown in FIG. 4C) and/or can display various types of information. In the illustrated embodiment, the screen display 400C is illustrated as showing a web browser window and a news story. This example is illustrative and should not be construed as being limiting in any way, as the other elements of the screen display illustrated and described herein can be displayed with any desired user interface elements.

The screen display 400C includes a relative quality of service indicator icon 422. The relative quality of service indicator icon 422 can be configured to provide a user or other entity associated with the user device 102 with an indicator of quality of service relative to other users and/or devices in a defined portion of a network 104. For example, as illustrated and described herein, the defined portion can include a sector 120 that serves the user device 102 and/or other users or devices. It should be understood that this example is illustrative and therefore should not be construed as being limiting in any way.

The relative quality of service indicator icon 422 can include various types of data and/or information and can correspond to the relative quality of service indicator 130 illustrated and described herein. Thus, as illustrated and described herein, the relative quality of service indicator icon 422 can include not only an indication of quality of service (e.g., downlink speed, uplink speed, latency, voice quality, etc.), but also depict a comparison between the quality of service of the user device 102 and other devices 122 on the same sector 120.

According to various embodiments, the relative quality of service indicator icon 422 can include not only visual information, but also can include UI controls that can be interacted with to provide additional information. Also, the relative quality of service indicator icon 422 can be color coded to provide a quick reference to quality (e.g., green can show above average quality of service, red can show below average quality of service, etc.). Although the relative quality of service indicator icon 422 is illustrated as being located at the top right of the screen display 400C, it should be understood that this example is illustrative. Some embodiments of the concepts and technologies described herein allow a user or other entity to move (e.g., relocate) the relative quality of service indicator icon 422 to any position in the display screen 400C, to hide the relative quality of service indicator icon 422, to shrink or grow the relative quality of service indicator icon 422, and/or to otherwise modify the presentation and/or visibility of the relative quality of service indicator icon 422. As such, the illustrated embodiment is illustrative and should not be construed as being limiting in any way.

In the illustrated embodiment, the relative quality of service indicator icon 422 includes other device information 424. The other device information 424 can show a value for quality of service (e.g., uplink speed, downlink speed, latency, call quality, or the like) to provide relative context for the information associated with the user device 102. The relative quality of service indicator icon 422 also includes user device information 426. The user device information 426 can show a value for quality of service (e.g., uplink speed, downlink speed, latency, call quality, or the like) for the user device 102. Thus, a user or other entity can, by viewing the relative quality of service indicator icon 422 and/or the components thereof, understand his or her quality of service relative to other devices or users on the same sector 120. This can provide an understanding not only of some value for uplink speed, downlink speed, latency, or other values, but also how these values compare to other users.

In some embodiments of the concepts and technologies described herein, a user or other entity can use various gestures to interact with the relative quality of service indicator icon 422. For example, if a user or other entity taps the relative quality of service indicator icon 422, additional information relating to the quality of service can be presented as will be illustrated and described below with reference to FIG. 4D. Additionally, or alternatively, a user may swipe, tap, use three dimensional gestures, and/or otherwise interact with the relative quality of service indicator icon 422 to see additional information. For example, the three views shown in FIG. 4C can be accessed, in some embodiments, by the user tapping, swiping, or pushing on the relative quality of service indicator icon 422, with each tap, swipe, or push changing the displayed information. It should be understood that these examples are illustrative and therefore should not be construed as being limiting in any way.

As explained herein, the ability to provide a user with relative context for his or her quality of service can result in an understanding of the value of upgrading or enhancing quality of service. Thus, while an uplink speed of one Megabit per second (Mbps) may not sound fast to a particular user, the knowledge that other users on the sector 120 are experiencing one hundred kilobit-per-second speeds (only one tenth the speed) may result in a happy and/or content user that appreciates that speed is not always absolute (the user may understand that he or she has what seems like a low speed that in the end is actually ten times the speed that others are experiencing). Thus, the presentation of relative quality of service indicators 130 such as the relative quality of service indicator icon 422 can help improve customer relations, customer satisfaction, and the like. It should be understood that this example is illustrative and therefore should not be construed as being limiting in any way. Because the relative quality of service indicator icon 422 can include additional and/or alternative components and/or representations of information, it should be understood that the illustrated example is illustrative and therefore should not be construed as being limiting in any way.

Figure 4D:
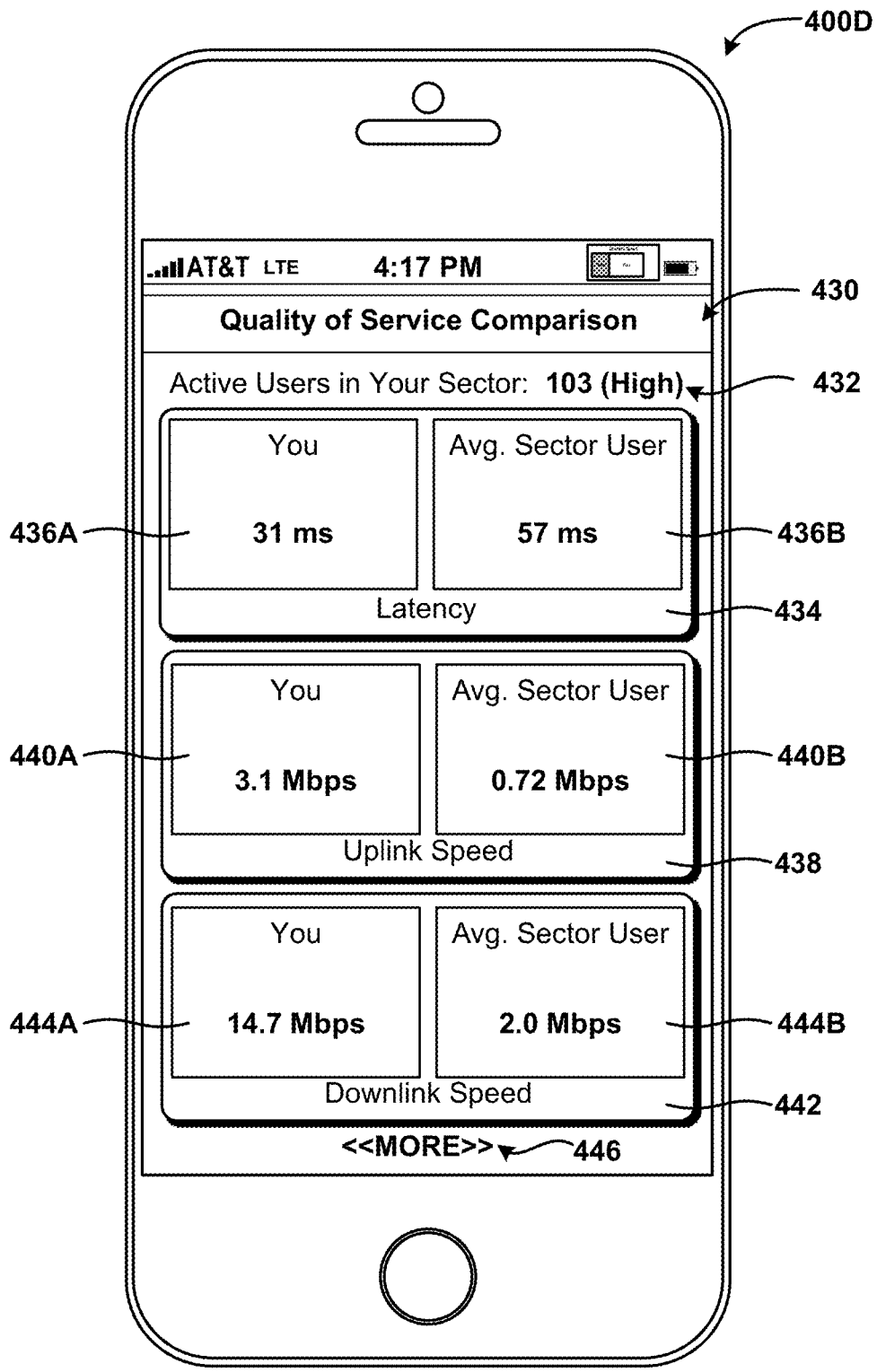

FIG. 4D shows an illustrative screen display 400D. According to some embodiments of the concepts and technologies described herein, the screen display 400D can be generated by a device such as the user device 102 in response to interactions with one or more quality of service user interfaces 128 and/or relative quality of service indicators 130 (e.g., the relative quality of service indicator icon 422 illustrated and described herein with reference to FIG. 4C). According to various embodiments, the screen display 400D can be presented, for example, when a user taps the relative quality of service indicator icon 422. Because the screen display 400D illustrated in FIG. 4D can be displayed at additional and/or alternative times, it should be understood that these examples are illustrative and therefore should not be construed as being limiting in any way. Also, because the UI diagram illustrated in FIG. 4D is illustrative of one contemplated example of the UIs that can be generated and/or displayed in accordance with the concepts and technologies disclosed herein, it should not be construed as being limited in any way.

The screen display 400D can include various menus and/or menu options (not shown in FIG. 4D). The screen display 400D also can include a quality of service comparison window 430. The quality of service comparison window 430 can be configured to present various types of information to users or other entities relating to their quality of service (relative to other users or devices). As shown in the illustrated embodiment, the quality of service comparison window 430 can include a user count 432. The user count 432 can show a number of activate users in a portion of the network 104 such as a sector 120 in which the user device 102 is operating. This user count 432 therefore can provide context for the other information presented by way of the quality of service comparison window 430 by showing if the sector 120 is heavily used or not. In the illustrated embodiment, the user count 432 shows one hundred three active users in the sector 120. A count of one hundred three active users can be considered high, in some circumstances, as illustrated in the quality of service comparison window 430. Because the user count 432 can show registered users instead of active users, and because any number of users may be shown, may be considered low or high (depending upon hardware and/or software associated with the network 104), and/or may be omitted entirely, it should be understood that this example is illustrative and therefore should not be construed as being limiting in any way.

As shown in the illustrated embodiment, the quality of service comparison window 430 also can include a latency comparison 434. The latency comparison 434 can include a representation 436A of a latency associated with the user device 102 and a representation 436B of a latency for other devices 122 in the same sector 120 (or other portion of the network 104) as the user. Thus, the latency comparison 434 can allow a user or other entity to see not only an absolute value for latency, but also information for other users or devices (e.g., the other devices 122) that can enable the user or other entity to make a comparison and thereby see his or her latency as relative to other users. Thus, the latency comparison 434 can provide a context and relative quality of service indicator for the latency of the connection of the user device 102. It should be understood that this example is illustrative and therefore should not be construed as being limiting in any way.

As shown in the illustrated embodiment, the quality of service comparison window 430 also can include an uplink speed comparison 438. The uplink speed comparison 438 can include a representation 440A of an uplink speed associated with the user device 102 and a representation 440B of an uplink speed for other devices 122 in the same sector 120 (or other portion of the network 104) as the user. Thus, the uplink speed comparison 438 can allow a user or other entity to see not only an absolute value for an uplink speed of his or her connection to the network 104, but also information for other users or devices (e.g., the other devices 122) that can enable the user or other entity to make a comparison and thereby see his or her uplink speed relative to other users' uplink speeds. Thus, the uplink speed comparison 438 can provide a context and relative quality of service indicator for the uplink speed of the connection of the user device 102. It should be understood that this example is illustrative and therefore should not be construed as being limiting in any way.

As shown in the illustrated embodiment, the quality of service comparison window 430 also can include a downlink speed comparison 442. The downlink speed comparison 442 can include a representation 444A of a downlink speed associated with the user device 102 and a representation 444B of a downlink speed for other devices 122 in the same sector 120 (or other portion of the network 104) as the user. Thus, the downlink speed comparison 442 can allow a user or other entity to see not only an absolute value for a downlink speed of his or her connection to the network 104, but also information for other users or devices (e.g., the other devices 122) that can enable the user or other entity to make a comparison and thereby see his or her downlink speed relative to other users' downlink speeds. Thus, the downlink speed comparison 442 can provide a context and relative quality of service indicator for the downlink speed of the connection of the user device 102. It should be understood that this example is illustrative and therefore should not be construed as being limiting in any way.

The quality of service comparison window 430 also can include a UI control 446 to display more relative quality of service indicators 130. Selection of the UI control 446 can cause the user device 102 to present additional and/or alternative comparisons and/or values for various quality of service indicators (e.g., call quality, power, or the like). Thus, selection of the UI control 446 can cause the user device 102 to hide the quality of service comparison window 430 shown in FIG. 4D and/or provide other information within the quality of service comparison window 430. Because additional or alternative controls can be included in the quality of service comparison window 430, it should be understood that the example embodiment shown in FIG. 4D is illustrative and therefore should not be construed as being limiting in any way.

Figure 5:
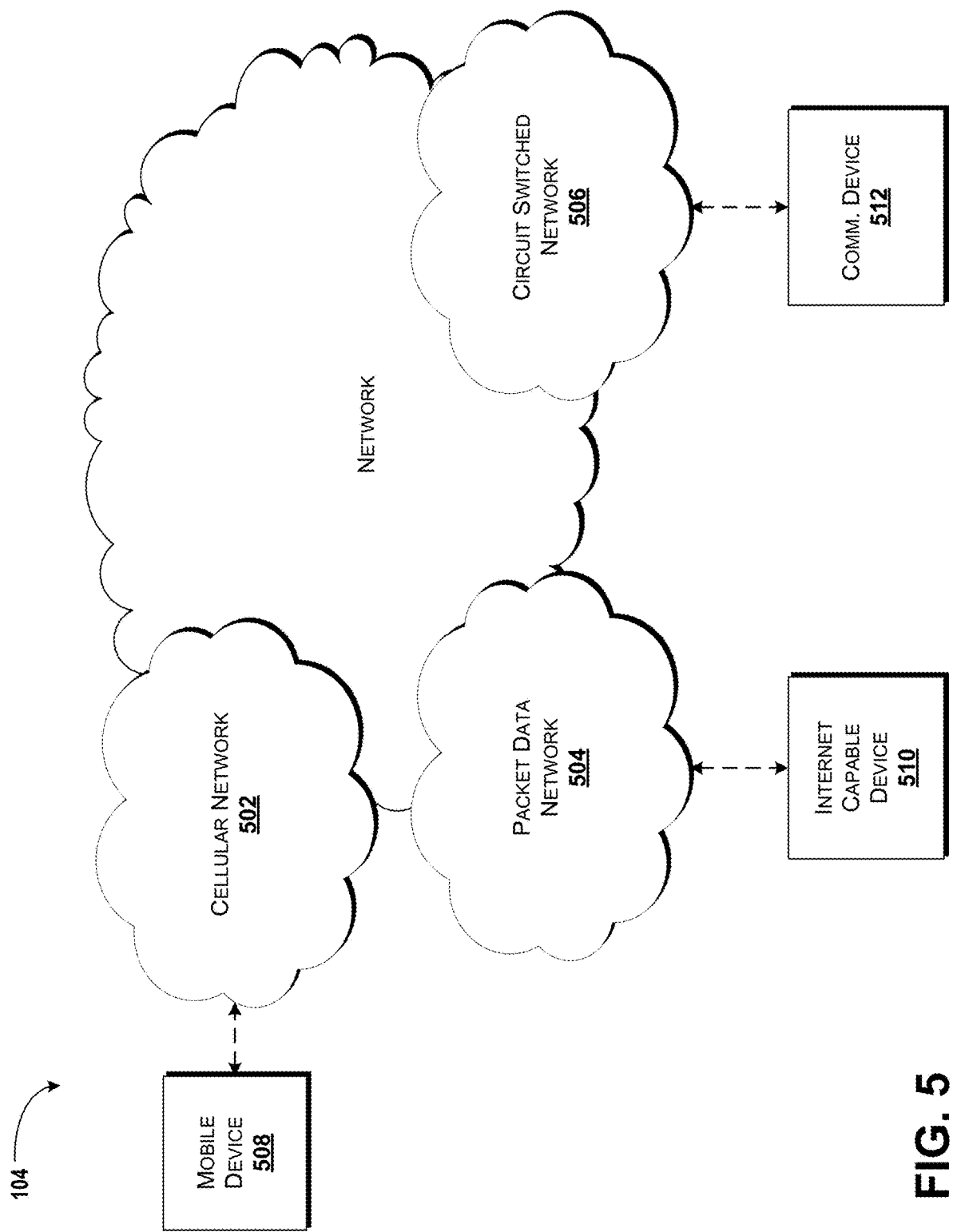
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
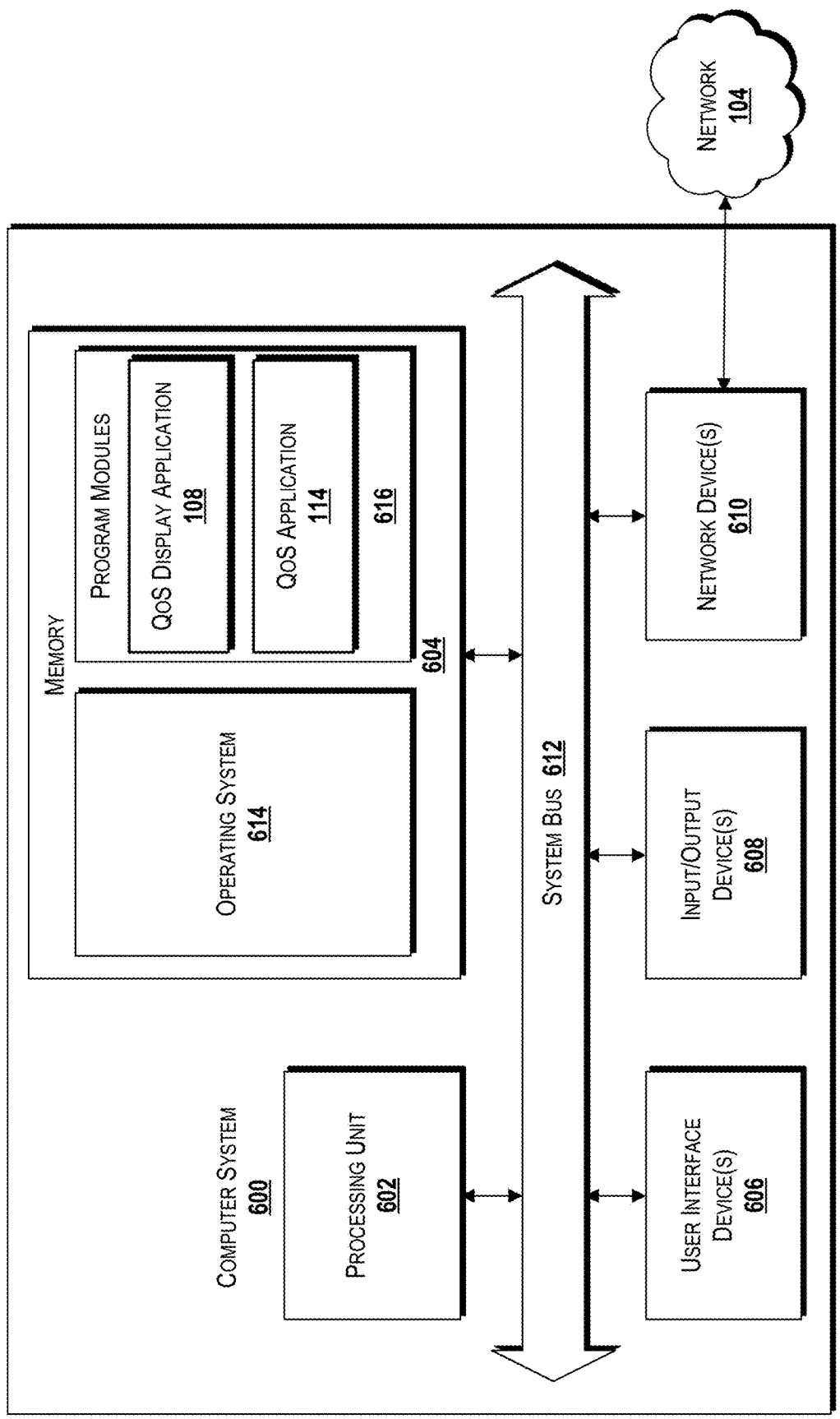
FIG. 6 is a block diagram illustrating an example computer system configured to generate and provide relative quality of service indicators, according to some illustrative embodiments of the concepts and technologies described herein.

FIG. 6 is a block diagram illustrating a computer system 600 configured to provide the functionality described herein for generating and providing relative quality of service indicators, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the quality of service display application 108 and/or the quality of service application 114. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the opt-in data 110, the offer 112, the quality of service data 124, the quality of service display data 126, the quality of service user interface 128, the relative quality of service indicator 130, the acceptance data 132, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
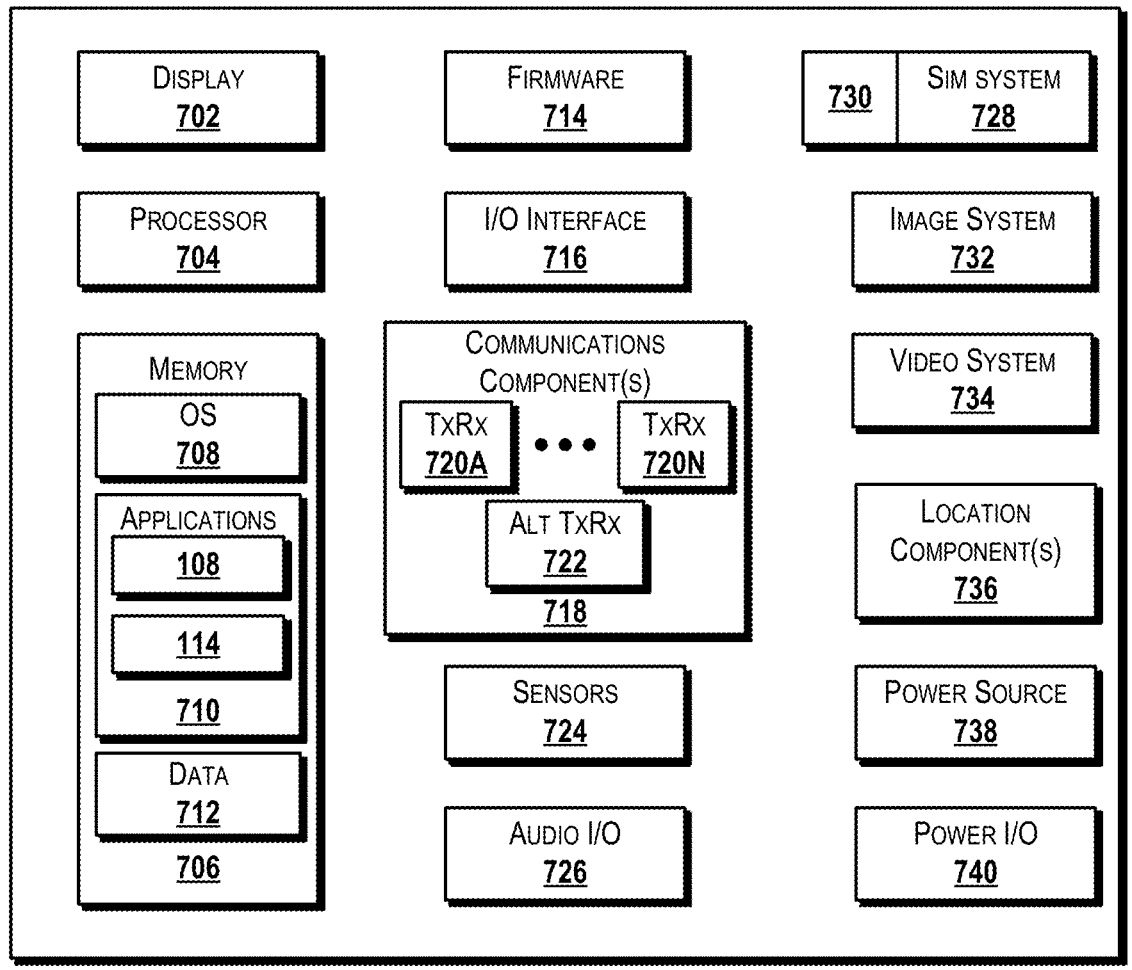
FIG. 7 is a block diagram illustrating an example mobile device configured to present a relative quality of service indicator, according to some illustrative embodiments of the concepts and technologies described herein.

Turning now to FIG. 7, an illustrative mobile device 700 and components thereof will be described. In some embodiments, the user device 102 described above with reference to FIGS. 1-4D can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements such as, for example, offers 112 and/or offer information, quality of service displays and/or elements of the quality of service user interface 128, the relative quality of service indicator 130, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the quality of service display application 108, the quality of service application 114, other computer-executable instructions stored in a memory 706, or the like. In some embodiments, the applications 710 also can include a UI application (not illustrated in FIG. 7).

The UI application can interface with the operating system 708 (e.g., the operating system 106 shown in FIG. 1), to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, interacting with quality of service information (e.g., a relative quality of service indicator 130), configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the quality of service display application 108, the quality of service application 114, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, opt-in data 110, the offer 112, the quality of service data 124, the quality of service display data 126, the quality of service user interface 128, the relative quality of service indicator 130, the acceptance data 132, user information, organization information, presence status information, user IDs, passwords, and application initiation (startup) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/ WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for generating and providing relative quality of service indicators have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
connecting, via a first communication link that is supported by a wireless network, with the wireless network,
receiving an offer to upgrade a first quality of service of the first communication link,
detecting an acceptance of the offer to upgrade the first quality of service, wherein the acceptance is obtained via a first user interface,
in response to detecting the acceptance, sending, directed to a computing device, data indicating the acceptance,
receiving, from the computing device, quality of service display data that represents the first quality of service and a second quality of service for a second communication link that is used by a further device that is connected to the wireless network, and
displaying the quality of service display data in a relative quality of service indicator that comprises depictions of the first quality of service and the second quality of service.

2. The device of claim 1, wherein the first user interface comprises the offer to upgrade the first quality of service, a first user interface control that is selectable to opt-in to the offer to upgrade the first quality of service, and a second user interface control that is selectable to opt-out of the offer to upgrade the first quality of service.

3. The device of claim 1, wherein the relative quality of service indicator indicates:
a first downlink speed for the first communication link; and
an average downlink speed for other communication links provided by the wireless network.

4. The device of claim 1, wherein the relative quality of service indicator indicates:
a first latency for the first communication link; and
an average latency for other communication links provided by the wireless network.

5. The device of claim 1, further comprising a display, wherein the relative quality of service indicator comprises an icon displayed on the display, and wherein the icon comprises
a first portion of the icon that depicts the first quality of service; and
a second portion of the icon that depicts the second quality of service.

6. The device of claim 1, wherein the relative quality of service indicator indicates:
a first uplink speed for the first communication link; and
an average uplink speed for other communication links supported by the wireless network.

7. The device of claim 1, further comprising a display, wherein the relative quality of service indicator comprises an icon displayed on the display, and wherein the icon comprises a user interface control that is selectable to present a quality of service comparison window comprising:
a latency comparison that indicates a latency of the first communication link and an average latency for other communication links provided by the wireless network;
an uplink speed comparison that indicates a first uplink speed for the first communication link and an average uplink speed for the other communication links; and
a downlink speed comparison that indicates a first downlink speed for the first communication link an average downlink speed for the other communication links.

8. A method comprising:
receiving, by a first user device that comprises a processor, an offer to upgrade a first quality of service of a first communication link that is used by the first user device, wherein the first communication link is supported by a wireless network, and wherein the first user device is connected to the wireless network;
detecting, at the first user device, an acceptance of the offer to upgrade the first quality of service, wherein the acceptance is obtained via a first user interface presented at the first user device;
in response to detecting the acceptance, sending, by the first user device and directed to a computing device, data indicating the acceptance;
receiving, by the first user device and from the computing device, quality of service display data that represents the first quality of service and a second quality of service for a second communication link that is used by a second user device that is connected to the wireless network; and
displaying, by the first user device, the quality of service display data in a relative quality of service indicator that comprises depictions of the first quality of service and the second quality of service.

9. The method of claim 8, wherein the first user interface comprises the offer to upgrade the first quality of service, a first user interface control that is selectable to opt-in to the offer to upgrade the first quality of service, and a second user interface control that is selectable to opt-out of the offer to upgrade the first quality of service.

10. The method of claim 8, wherein the relative quality of service indicator indicates:
a first downlink speed for the first communication link; and
an average downlink speed for other communication links provided by the wireless network.

11. The method of claim 8, wherein the relative quality of service indicator indicates:
a first latency for the first communication link; and
an average latency for other communication links provided by the wireless network.

12. The method of claim 8, wherein the relative quality of service indicator comprises an icon displayed on a display of the first user device, and wherein the icon comprises:
a first portion of the icon that depicts the first quality of service; and
a second portion of the icon that depicts the second quality of service.

13. The method of claim 8, wherein the relative quality of service indicator indicates:
a first uplink speed for the first communication link; and
an average uplink speed for other communication links supported by the wireless network.

14. The method of claim 8, wherein the relative quality of service indicator comprises an icon displayed on a display of the first user device, and wherein the icon comprises a user interface control that is selectable to cause the first user device to present a quality of service comparison window comprising:

a latency comparison that indicates a latency of the first communication link and an average latency for other communication links provided by the wireless network;

an uplink speed comparison that indicates a first uplink speed for the first communication link and an average uplink speed for the other communication links; and a downlink speed comparison that indicates a first downlink speed for the first communication link an average downlink speed for the other communication links.

15. A computer storage medium having computer-executable instructions stored thereon that, when executed by a processor, cause the processor to perform operations comprising:

receiving, by a first user device, an offer to upgrade a first quality of service of a first communication link that is used by the first user device, wherein the first communication link is supported by a wireless network, and wherein the first user device is connected to the wireless network;

detecting an acceptance of the offer to upgrade the first quality of service, wherein the acceptance is obtained via a first user interface presented at the first user device;

in response to detecting the acceptance, sending, directed to a computing device, data indicating the acceptance;

receiving, from the computing device, quality of service display data that represents the first quality of service and a second quality of service for a second communication link that is used by a second user device that is connected to the wireless network; and displaying the quality of service display data in a relative quality of service indicator that comprises depictions of the first quality of service and the second quality of service.

16. The computer storage medium of claim 15, wherein the first user interface comprises the offer to upgrade the first quality of service, a first user interface control that is selectable to opt-in to the offer to upgrade the first quality of service, and a second user interface control that is selectable to opt-out of the offer to upgrade the first quality of service.

17. The computer storage medium of claim 15, wherein the relative quality of service indicator indicates:

a first downlink speed for the first communication link; and an average downlink speed for other communication links provided by the wireless network.

18. The computer storage medium of claim 15, wherein the relative quality of service indicator indicates:

a first latency for the first communication link; and an average latency for other communication links provided by the wireless network.

19. The computer storage medium of claim 15, wherein the relative quality of service indicator indicates:

a first uplink speed for the first communication link; and an average uplink speed for other communication links supported by the wireless network.

20. The computer storage medium of claim 15, wherein the relative quality of service indicator comprises an icon displayed on a display of the first user device, and wherein the icon comprises a user interface control that is selectable to cause the first user device to present a quality of service comparison window comprising:

a latency comparison that indicates a latency of the first communication link and an average latency for other communication links provided by the wireless network;

an uplink speed comparison that indicates a first uplink speed for the first communication link and an average uplink speed for the other communication links; and a downlink speed comparison that indicates a first downlink speed for the first communication link an average downlink speed for the other communication links.

* * * * *